US008555714B2

(12) United States Patent
Chae et al.

(10) Patent No.: US 8,555,714 B2
(45) Date of Patent: Oct. 15, 2013

(54) APPARATUS FOR MEASURING THE AMOUNT OF SNOW COVER AND SNOWFALL USING ELECTRICAL CONDUCTION

(75) Inventors: Byung-Gon Chae, Daejeon (KR); Jung-Hae Choi, Daejeon (KR); Young-Cheon Won, Seoul (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 158 days.

(21) Appl. No.: 13/294,653

(22) Filed: Nov. 11, 2011

(65) Prior Publication Data
US 2013/0047718 A1    Feb. 28, 2013

(30) Foreign Application Priority Data
Aug. 26, 2011    (KR) .......................... 10-2011-0085556

(51) Int. Cl.
*G01W 1/00*    (2006.01)
(52) U.S. Cl.
USPC ................... 73/170.23; 73/170.17; 73/170.21
(58) Field of Classification Search
None
See application file for complete search history.

(56) References Cited

U.S. PATENT DOCUMENTS

| | | | | |
|---|---|---|---|---|
| 4,583,399 | A * | 4/1986 | Walsh et al. | 73/170.19 |
| 4,909,070 | A * | 3/1990 | Smith | 73/73 |
| 4,992,667 | A * | 2/1991 | Abelentsev et al. | 250/390.05 |
| 5,886,301 | A * | 3/1999 | Preble | 177/1 |
| 6,044,699 | A * | 4/2000 | Greenblatt et al. | 73/170.17 |
| 6,640,649 | B1 * | 11/2003 | Paz et al. | 73/861.41 |
| 6,810,732 | B2 * | 11/2004 | Shon | 73/304 R |
| 6,832,522 | B2 * | 12/2004 | Schaefer et al. | 73/715 |
| 7,584,656 | B2 * | 9/2009 | Senghaas et al. | 73/170.21 |

FOREIGN PATENT DOCUMENTS

JP    07035670 A *    2/1995

* cited by examiner

*Primary Examiner* — Andre J Allen
*Assistant Examiner* — Jermaine Jenkins
(74) *Attorney, Agent, or Firm* — Ladas & Parry LLP

(57) ABSTRACT

An apparatus for measuring the amount of snow cover and snowfall using electrical conduction. The apparatus includes: a collection container in which the snow is flowed and is piled up and which is opened upwards; a supporting mount for supporting the collection container; a first conductor that is disposed on a bottom of the collection container and contacts the snow piled up on the collection container; a plurality of second conductors that are disposed spaced apart from each other on sidewalls of the collection container in a height direction of the collection container and contact the snow piled up on the collection container; a power supply unit that is electrically connected to the first conductor and the plurality of second conductors; and a detection sensor for determining that the first conductor and the second conductors are electrically connected to each other, based on the snow piled up on the collection container.

11 Claims, 4 Drawing Sheets

APPARATUS FOR MEASURING THE AMOUNT OF SNOW COVER AND SNOWFALL USING ELECTRICAL CONDUCTION

CROSS-REFERENCE TO RELATED PATENT APPLICATION

This application claims the benefit of Korean Patent Application No. 10-2011-0085556, filed on Aug. 26, 2011, in the Korean Intellectual Property Office, the disclosure of which is incorporated herein in its entirety by reference.

BACKGROUND OF THE INVENTION

1. Field of the Invention

The present invention relates to a measuring apparatus relating to weather and climate, and more particularly, to an apparatus for measuring the amount of snow cover that indicates the amount of snow piled up and the amount of snowfall that indicates the amount of resulting water after the snow is melted.

2. Description of the Related Art

When it rains in a natural mountain or on a slope surface consisting of soil, earth and sand and water of soil layers are flowed towards a lower position of an inclined plane along an inclination direction due to the effect of rainfall. Thus, erosion of soil layers occurs in an upper or middle portion of the inclined plane, and earth and sand moved from the upper portion of the inclined plane are deposited on a region with a relatively low altitude and a gentle inclination.

Such erosion and deposition of soil layers is the most fundamental cause of a natural change in topography. In the case of severe erosion of soil layers, it may cause landslide or collapse of the inclined plane. In addition, when earth and sand lost from the inclined plane meets reaches a small stream or the like, it is moved to downstream, and in this procedure, a portion of earth and sand is deposited on a bottom portion of the stream and causes an increase in riverbed elevation. The increase in riverbed elevation causes a reduction in a cross-sectional area of a river in which the river flows over, and this may be a potential cause of flood.

One of significant causes for earth and sand movement is rainfall and snowfall caused by snow or rain. Thus, it is very important to investigate the relationship between the amount earth and sand movement and the amount of rainfall and snowfall.

Although a variety of measuring devices with improved accuracy of measurement have been developed as rain gauges, the development of a method and apparatus for measuring the amount of snow cover is not sufficient. In other words, in the related art, the amount of snow cover is measured by weight, and the amount of snow that corresponds to 10% of the amount of snow cover is converted into the amount of snowfall. However, a water content in the snow varies depending on whether snow cover is dry or wet. Thus, it is not accurate to measure the amount of snow cover by using weight.

In addition, methods of measuring the amount of snow cover (height of snow cover) by using optics or ultrasounds have been developed. However, there is a limitation in inaccurate measurement of the amount of snow cover. In particular, the amount of snowfall after the snow is melted cannot be measured.

SUMMARY OF THE INVENTION

The present invention provides an apparatus for measuring the amount of snow cover and snowfall in which the amount of snow cover relating to a height of snow piled up may be accurately measured by using the point that current may flow through the snow and the amount of snowfall relating to a weight of resulting water after the snow is melted may be measured.

According to an aspect of the present invention, an apparatus for measuring the amount of snow cover and snowfall includes: a collection container in which the snow is flowed and is piled up and which is opened upwards; a supporting mount for supporting the collection container; a first conductor that is disposed on a bottom of the collection container and contacts the snow piled up on the collection container; a plurality of second conductors that are disposed spaced apart from each other on sidewalls of the collection container in a height direction of the collection container and contact the snow piled up on the collection container; a power supply unit that is electrically connected to the first conductor and the plurality of second conductors; and a detection sensor for determining that the first conductor and the second conductors are electrically connected to each other, based on the snow piled up on the collection container.

The plurality of second conductors may be disposed alternately on one side and the other side of sidewalls of the collection container by a predetermined distance and may have different heights of arrangement.

An inside of the collection container excluding an exposed portion of the first conductor and the second conductors may include a non-conductor.

The inside of the collection container may be coated with a rubber material.

A drainage hole through resulting water after the snow is melted is discharged, may be formed in a lower portion of the collection container.

The apparatus may further include a rain gauge that is disposed on a lower portion of the collection container so as to measure the amount of snowfall by measuring a weight of water discharged through the drainage hole of the collection container.

A plurality of drainage holes may be formed in a bottom surface of the collection container, and the apparatus may further include a water-collecting portion having a shape of a funnel that is combined with the lower portion of the collection container so that water that is discharged from the plurality of drainage holes is discharged through one discharge passage.

The rain gauge may include a tipping bucket rain gauge.

The apparatus may further include a heating pad that is attached to the inside of the collection container so as to melt the snow by heating the snow that is piled up on the collection container.

When the snow is gradually piled up on the collection container, the detection sensor may determine that the second conductors that are disposed from a lower portion to an upper portion of the collection container are sequentially electrically connected to the first conductor, and when it is not determined by the detection sensor for a predetermined amount of time that the second conductor that is disposed in a higher position than the second conductor that is determined to be last electrically connected to the first conductor is newly electrically connected to the first conductor, the heating pad may be activated to heat the snow.

A heating wire for generating heat by using an electrical resistance may be disposed in the heating pad, and bimetal may be installed at the heating wire and may cut off a supply of power to the heating wire when the heating wire is heated at over a predetermined temperature.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, an apparatus for measuring the amount of snow cover and snowfall using electrical conduction according to an exemplary embodiment of the present invention will be described with reference to the accompanying drawings, in which the exemplary embodiment of the present invention is shown.

Figure 1:
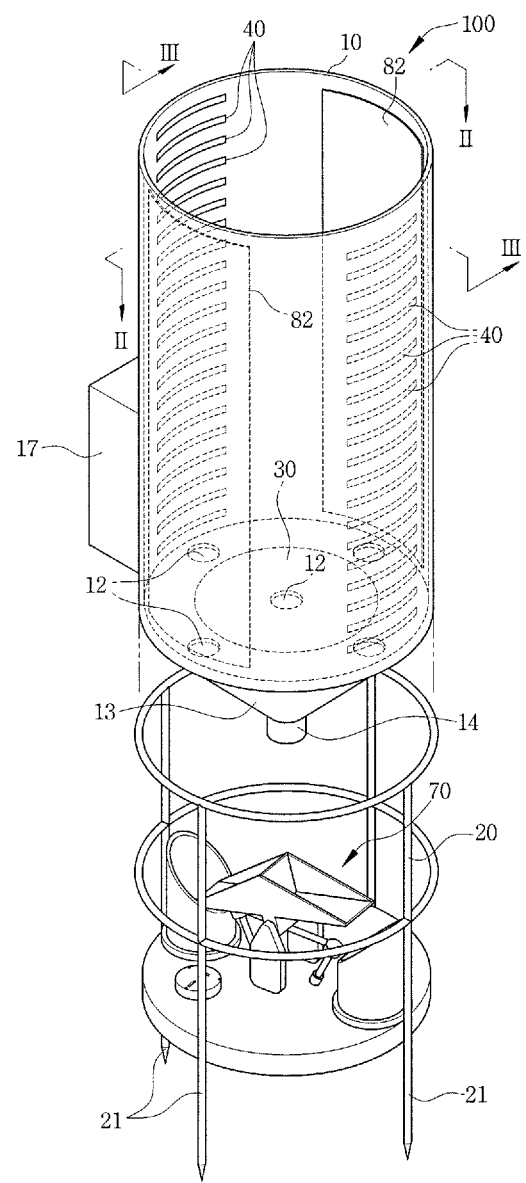
FIG. 1 is a schematic perspective view of an apparatus for measuring the amount of snow cover and snowfall using electrical conduction according to an embodiment of the present invention.
Figure 2:
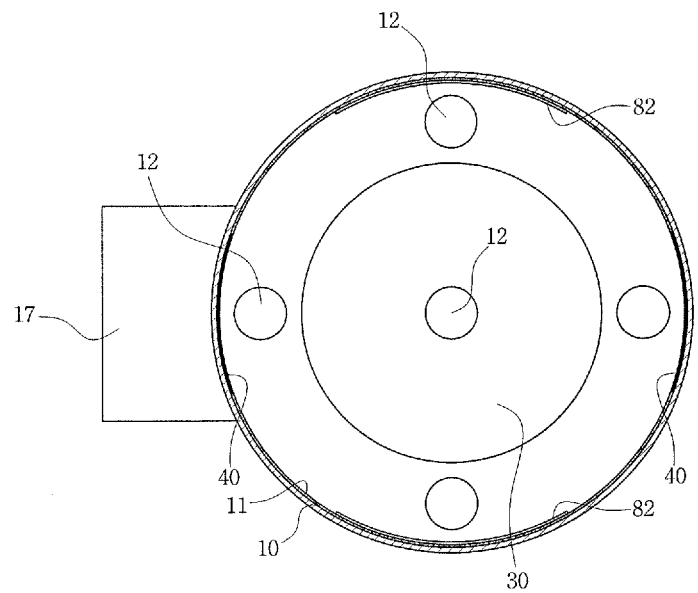
FIG. 2 is a schematic cross-sectional view taken along a line II-II of FIG. 1.
Figure 3:
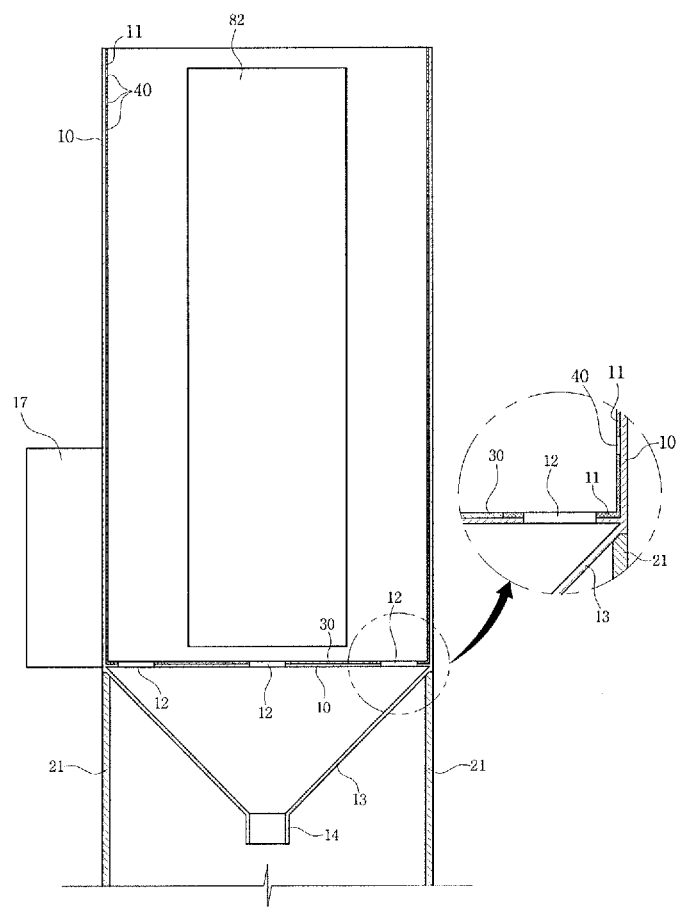
FIG. 3 is a schematic cross-sectional view taken along a line III-Ill of FIG. 1.

FIG. 1 is a schematic perspective view of an apparatus 100 for measuring the amount of snow cover and snowfall using electrical conduction according to an embodiment of the present invention, and FIG. 2 is a schematic cross-sectional view taken along a line II-II of FIG. 1, and FIG. 3 is a schematic cross-sectional view taken along a line III-III of FIG. 1.

Referring to FIGS. 1 through 3, the apparatus 100 for measuring the amount of snow cover and snowfall using electrical conduction includes a collection container 10, a supporting mount 20, a first conductor 30, a plurality of second conductors 40, a power supply unit 50, and a detection sensor 60.

The collection container 10 provides a space in which the snow is flowed and is piled up. The collection container 10 is opened upwards. In the current embodiment, the collection container 10 has an approximately cylindrical shape (or square pillar shape). The specification of the collection container 10 may vary according to the amount of snow cover and snowfall of a region in which the apparatus 100 for measuring the amount of snow cover and snowfall using electrical conduction is installed. In the current embodiment, the cylindrical collection container 10 is formed of a stainless material and has the specification of a diameter of 10 cm and a height of 160 cm.

As will be described below, since current does not have to flow through an inside of the collection container 10, the inside of the collection container 11 is coated with rubber 11 that is a non-conductor.

A plurality of drainage holes 12 are formed in the bottom of the collection container 10. In the current embodiment, one drainage hole 12 is formed in the middle of the bottom of the collection container 10, and four drainage holes 12 are formed in a circumferential direction of the collection container 10, as illustrated in FIG. 2. The drainage holes 12 are used to discharge resulting water after the snow is melted, from the collection container 10. In the current embodiment, the drainage holes 12 have a diameter of 1 cm.

In addition, a water-collecting portion 13 is disposed on a lower portion of the collection container 10. The water-collecting portion 13 is used to discharge water that is discharged from the plurality of drainage holes 12 through one discharge passage 14. The water-collecting portion 13 has the shape of a funnel in which a lower portion of the water-collecting portion 13 is narrower than an upper portion of the water-collecting portion 13. The discharge passage 14 is formed on the lowermost portion of the water-collecting portion 13 having the shape of a funnel. The amount of water that is discharged through the drainage passage 14 is measured by using a snow gauge that will be described below.

As described above, the collection container 10 provides a space in which the snow may be piled up, so that the amount of snow cover may be measured. In addition, the collection container 10 may collect resulting water after the snow is melted and discharge water so that the amount of resulting water after the snow is melted, i.e., the amount of snowfall may be measured.

The supporting mount 20 for supporting the collection container 10 having the above structure is disposed below the collection container 10, as illustrated in FIGS. 1 and 3. The collection container 10 is combined with an upper portion of the supporting mount 20 by using a well-known combination portion (not shown), such as a bolt, a nut or the like. A plurality of fixing pins 21 are disposed on a lower portion of the supporting mount 20 so that the supporting mount 20 may be inserted in the ground. A rain gauge 70 is disposed in the supporting mount 20 on a lower side of the discharge passage 14 of the collection container 10.

According to the present invention, the first conductor 30, the plurality of second conductors 40, the power supply unit 50, and the detection sensor 60 are used to measure the amount of snow cover.

The first conductor 30 is installed at the bottom of the collection container 10. The first conductor 30 is formed of a conductive material, in the current embodiment, disc-shaped copper. When the snow is piled up on the collection container 10, the first conductor 30 contacts the snow.

The plurality of second conductors 40 are installed at sidewalls of the collection container 10. The second conductors 40 are formed of conductive material, like the first conductor 30, in the current embodiment, bar-shaped copper. In the current embodiment, the second conductors 40 are manufactured to have a width of 5 cm and a height of 0.2 cm, are exposed to the inside of the collection container 10 and thus may contact the snow that is piled up on the collection container 10.

Figure 4:
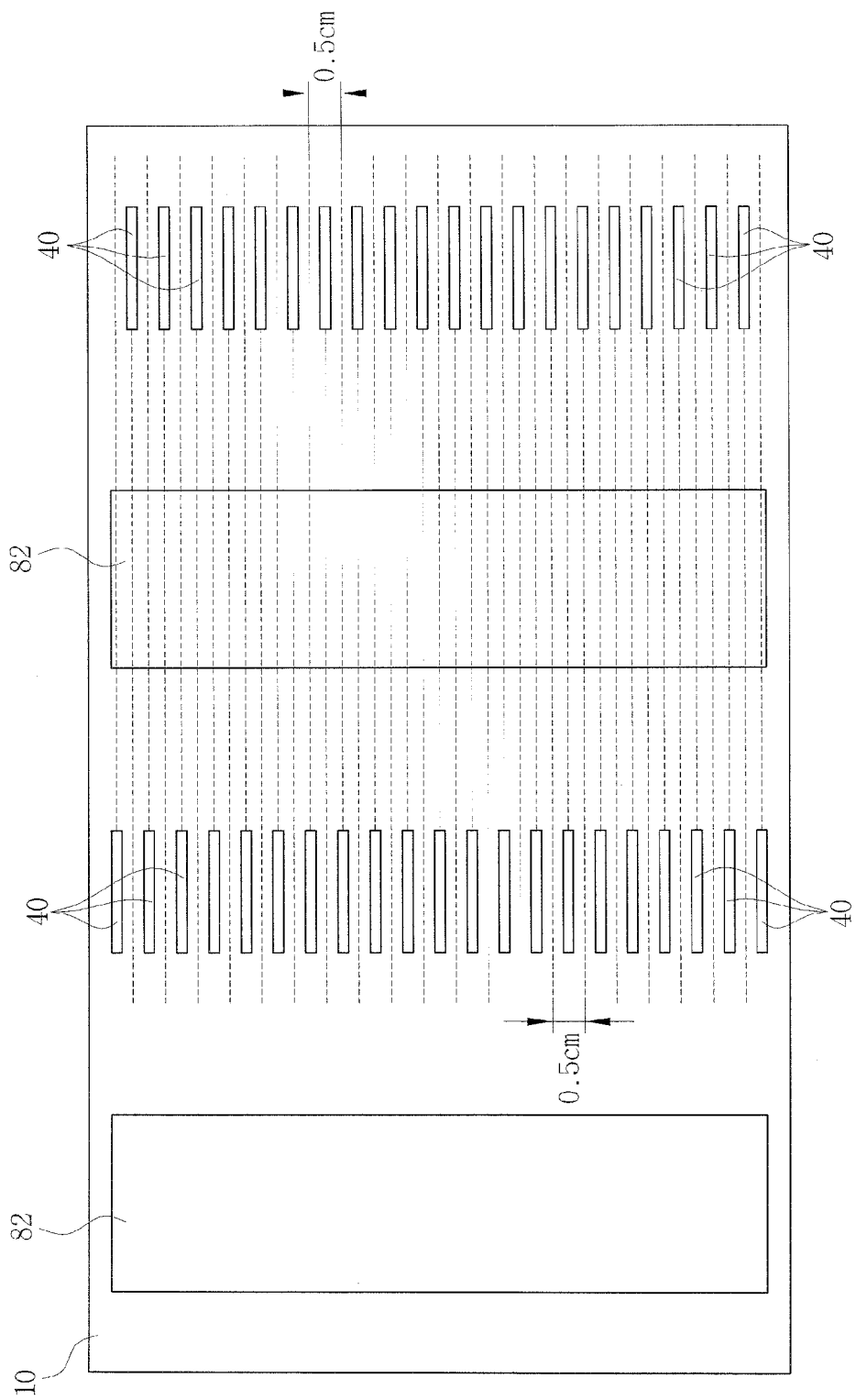
FIG. 4 is a planar view illustrating a state where a collection container illustrated in FIG. 1 is unfold.

In the current embodiment, the second conductors 40 are disposed spaced apart from each other on one side and the other side of sidewalls of the collection container 10, respectively, in a height direction of the collection container 10. The second conductors 40 are disposed alternately on one side and the other side of sidewalls of the collection container 10, respectively. In other words, as illustrated in the planar view of FIG. 4, the second conductors 40 are disposed spaced apart from each other on one side and the other side of sidewalls of the collection container 10, respectively, by a distance of 0.5 cm and are disposed alternately on one side and the other side of sidewalls of the collection container 10, respectively. Thus, the second conductors 40 are disposed in the height direction of the collection container 10 by a distance of 0.25 cm.

Figure 5:
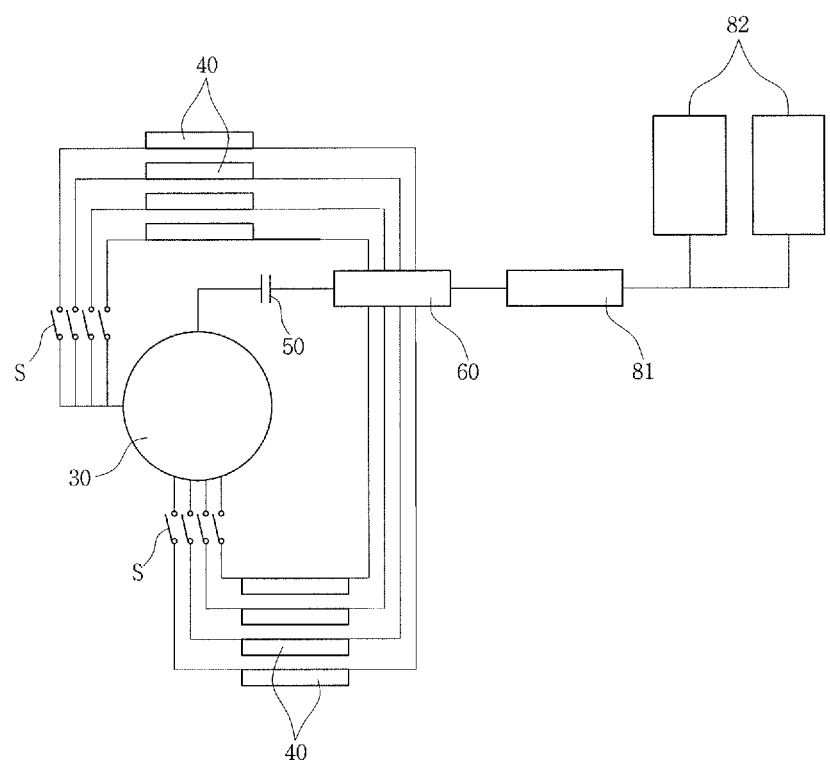
FIG. 5 illustrates the state of electrical connection of the apparatus for measuring the amount of snow cover and snowfall using electrical conduction illustrated in FIG. 1.

FIG. 5 illustrates the state of electrical connection of the apparatus for measuring the amount of snow cover and snowfall using electrical conduction illustrated in FIG. 1

Referring to FIG. 5, the first conductor 30 and the plurality of second conductors 40 are connected to the power supply unit 50 in parallel. In the current embodiment, a power supply voltage of 12 V is used.

Referring back to FIG. 5, a switch S that electrically connects or disconnects the first conductor 30 and the second conductors 40 to or from each other is indicated. In this regard, the switch S is not a real switch but is used to indicate that the snow in the collection container 10 serves as a switch. In other words, when the snow is between the first conductor 30 and the second conductors 40, due to moisture inside the snow, current flows through the first conductor 30 and the second conductors 40, and when there is no snow between the first conductor 30 and the second conductors 40, there is no electrical medium and thus, the first conductor 30 and the second conductors 40 are electrically disconnected from each other.

In other words, the second conductors 40 that are disposed in a space formed between the bottom of the collection container 10 and a height of the snow piled up are electrically connected to the first conductor 30 via the snow between the first conductor 30 and the second conductors 40, and the second conductors 40 that are disposed in a region of the collection container 10 in which the snow is not piled up yet, have no electrical medium and thus are not electrically connected to the first conductor 30.

The detection sensor 60 is electrically connected to the first conductor 30 and the second conductors 40 and determines whether the first conductor 30 and the second conductors 40 are electrically connected to each other. The state of electrical connection between the first conductor 30 and the second conductors 40 is transmitted to a controller (not shown) that is disposed in a control box 17 of the collection container 10. The controller determines the second conductor 40 that is disposed in the highest position among the plurality of second conductors 40 that are electrically connected to the first conductor 30.

Since a height at which the second conductors 40 are installed, is stored in the controller, the controller may determine a height of the snow that is piled up on the collection container 10. As described above, in the current embodiment, the second conductors 40 are disposed spaced apart from each other by a distance of 0.25 cm so that the height of the snow piled up may be measured as a height at which the second conductors 40 are disposed spaced apart from each other by a distance of 0.25 cm between the second conductors 40. In order to measure the height of the snow piled up more accurately, the distance between the second conductors 40 may be further reduced.

The controller determines that the second conductors 40 that are disposed from a lower portion to an upper portion of the collection container 10 are sequentially electrically connected to the first conductor 30 when the snow begins to fall. In this procedure, when it is not determined by the controller for a predetermined amount of time that the second conductor 40 that is disposed in a higher position than the second conductor 40 that is determined to be last electrically connected to the first conductor 30 is newly electrically connected to the first conductor 30, the controller determines that the snow does not fall any more, and measurement of the amount of snow cover is completed, and a heating pad 82 that will be described below is activated.

The controller stores pieces of data, such as time at which the second conductor 40 disposed in the lowermost position of the collection container 10 is electrically connected to the first conductor 30, times at which the second conductors 40 are sequentially electrically connected to the first conductor 30, and time at which the second conductor 40 is last electrically connected to the first conductor 30, based on signals received from the detection sensor 60. The controller may determine time at which the snow began to fall, the amount of snow cover according to times, the final amount of snow cover, and times at which the snow stopped to fall, based on the pieces of data.

As described above, when sensing of the amount of snow cover is completed, the snow in the collection container 10 needs to be discharged for further measurement of the amount of snow cover. Thus, according to the present invention, the heating pad 82 is attached to the inside of the collection container 10. In the current embodiment, two heating pads 82 are attached to both sides of the inside of the collection container 10.

The heating pads 82 include pad members and a heating wire that is disposed between the pad members. The heating wire is a heating tool using the point that heat is generated by resistance generated when current flows through the heating wire. The heating wire is disposed in a zigzag form between the pad members. However, the heating wire is disposed long in a vertical direction of the pad members so that portions of the zigzag form in which the heating wire is bent, are upper and lower portions of the pad members.

In other words, since the snow piled up on the collection container 10 is melted along the heating wire, when the heating wire is disposed long in the vertical direction of the pad members, a water passage through which resulting water after the snow is melted may be naturally discharged from an upper side to a lower side of the water passage, is formed. For example, unlike in the current embodiment, when an electric heating wire is disposed long in a horizontal direction of the pad members, the water passage is formed along the horizontal direction, and resulting water after the snow is melted is not easily discharged compared to the case where the water passage is formed in the vertical direction of the pad members.

The heating pads 82 are formed of a flexible material that may be closely adhered to an inside or outside of the collection container 10 formed as a curved surface. The heating pads 82 are formed in the form of a thin layer.

In addition, bimetal is installed at the heating wire, and when the heating wire is heated at over a predetermined temperature, bimetal prevents the heating wire from being over-heated by cutting off the supply of power. The heating pads 82 share the first conductor 30, the second conductors 40, and the power supply unit 50, as illustrated in FIG. 5.

Resulting water after the snow is melted due to the heating pads 82, is discharged to a lower portion of the collection container 10 via the drainage holes 12 and the discharge passage 14.

In one embodiment of the present invention, the rain gauge 70 is installed at the lower portion of the discharge passage 14 so as to accurately measure the amount of resulting water after the snow is melted, i.e., the amount of snowfall. In a general system for measuring the amount of snow cover, only the amount of snow cover is measured, and in the case of wet snow including a large amount of moisture, 10% of the amount of snow cover is converted into the amount of snowfall or rain, and in the case of dry snow that does not include a large amount of moisture, 3-4% of the amount of snow cover is converted into the amount of snowfall or rain. Thus, accurate measurement has not been performed.

In particular, it is not easy to determine the amount of moisture contained in the snow, and measurement at an unmanned observation center that is located at the mountain or at a remote area has not been easily performed. Thus, according to the present invention, the rain gauge 70 is installed so as to accurately measure the amount of resulting water after the snow is melted.

Water that is discharged through the discharge passage 14 of the collection container 10 is flowed in the rain gauge 70, and the amount of snowfall is accurately measured. In the current embodiment, a tipping bucket rain gauge is used as the rain gauge 70. However, the present invention is not limited thereto, and a variety of types of rain gauges may be used. The rain gauge 70 is a well-known apparatus and thus, detailed description thereof will not be provided here.

Although not shown, the rain gauge 70 is connected to the controller and transmits data relating to the amount of snowfall to the controller.

The controller stores data relating to the amount of snow cover and snowfall and pieces of data relating to time and transmits the pieces of data to a weather centre or the like in real-time or at a predetermined time interval.

As described above, according to the present invention, a height of the snow piled up may be measured depending on whether the first conductor 30 and the second conductors 40 are electrically connected to each other, and after the snow stops to fall, the amount of snowfall may be accurately measured by melting the snow by using the heating pads 82.

In other words, both the amount of snow cover and the amount of snowfall may be accurately measured using one apparatus.

Unexplained reference numeral 81 of FIG. 5 represents a control unit that is installed at the controller so as to control the heating pads 82.

As described above, in an apparatus for measuring the amount of snow cover and snowfall according to the present invention, a height of snow piled up may be accurately measured by using electrical connection between a first conductor and a second conductor.

In addition, without estimating the amount of snowfall by converting the amount of snow cover, the amount of snowfall after the snow is melted may be accurately measured by using a rain gauge so that accurate measurement of the amount of snowfall may be possible.

Pieces of data relating to the amount of snow cover and snowfall are stored in a controller, and the controller may transmit the pieces of data to a weather centre or a disaster management center via communication therebetween so that disaster etc. may be efficiently prevented.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for measuring an amount of snow cover and snowfall, the apparatus comprising:
    a collection container in which the snow is flowed and is piled up and which is opened upwards;
    a supporting mount for supporting the collection container;
    a first conductor that is disposed on a bottom of the collection container and contacts the snow piled up on the collection container;
    a plurality of second conductors that are disposed spaced apart from each other on sidewalls of the collection container in a height direction of the collection container and contact the snow piled up on the collection container;
    a power supply unit that is electrically connected to the first conductor and the plurality of second conductors; and
    a detection sensor for determining that the first conductor and the second conductors are electrically connected to each other, based on the snow piled up on the collection container.

2. The apparatus of claim 1, wherein the plurality of second conductors are disposed alternately on one side and the other side of sidewalls of the collection container by a predetermined distance and have different heights of arrangement.

3. The apparatus of claim 1, wherein an inside of the collection container excluding an exposed portion of the first conductor and the second conductors comprises a non-conductor.

4. The apparatus of claim 3, wherein the inside of the collection container is coated with a rubber material.

5. The apparatus of claim 1, wherein a drainage hole through resulting water after the snow is melted is discharged, is formed in a lower portion of the collection container.

6. The apparatus of claim 5, further comprising a rain gauge that is disposed on a lower portion of the collection container so as to measure the amount of snowfall by measuring a weight of water discharged through the drainage hole of the collection container.

7. The apparatus of claim 6, wherein a plurality of drainage holes are formed in a bottom surface of the collection container, the apparatus further comprising a water-collecting portion having a shape of a funnel that is combined with the lower portion of the collection container so that water that is discharged from the plurality of drainage holes is discharged through one discharge passage.

8. The apparatus of claim 7, wherein the rain gauge comprises a tipping bucket rain gauge.

9. The apparatus of claim 5, further comprising a heating pad that is attached to the inside of the collection container so as to melt the snow by heating the snow that is piled up on the collection container.

10. The apparatus of claim 9, wherein, when the snow is gradually piled up on the collection container, the detection sensor determines that the second conductors that are disposed from a lower portion to an upper portion of the collection container are sequentially electrically connected to the first conductor, and when it is not determined by the detection sensor for a predetermined amount of time that the second conductor that is disposed in a higher position than the second conductor that is determined to be last electrically connected to the first conductor is newly electrically connected to the first conductor, the heating pad is activated to heat the snow.

11. The apparatus of claim 9, wherein a heating wire for generating heat by using an electrical resistance is disposed in the heating pad, and bimetal is installed at the heating wire and cuts off a supply of power to the heating wire when the heating wire is heated at over a predetermined temperature.

* * * * *